United States Patent [19]

Hasegawa et al.

[11] 4,198,816
[45] Apr. 22, 1980

[54] APPARATUS FOR PREVENTING AFTER-FIRE OF AN INTERNAL COMBUSTION ENGINE

[75] Inventors: Yutaka Hasegawa; Koichi Hirakata, both of Toyota, Japan

[73] Assignee: Toyota Jidosha Kogyo Kabushiki Kaisha, Toyota, Japan

[21] Appl. No.: 778,553

[22] Filed: Mar. 17, 1977

[30] Foreign Application Priority Data

Dec. 15, 1976 [JP]  Japan ................................ 51-149868

[51] Int. Cl.² ............................................... F01N 3/10
[52] U.S. Cl. ............................... 60/305; 123/119 LR; 123/DIG. 11
[58] Field of Search ................. 60/304, 305, 306, 307; 123/119 LR, 119 D, DIG. 11

[56] References Cited

U.S. PATENT DOCUMENTS

| | | | |
|---|---|---|---|
| 3,500,807 | 3/1970 | Daigh | 60/305 X |
| 3,662,541 | 5/1972 | Sawada et al. | 60/305 X |
| 3,828,552 | 8/1974 | Nishiguchi | 60/304 |
| 3,906,724 | 9/1975 | Yoshizahi | 60/305 |
| 3,934,411 | 1/1976 | Masaki et al. | 60/305 X |

Primary Examiner—Ira S. Lazarus

[57] ABSTRACT

The apparatus according to the present invention includes means for conducting secondary air into the exhaust lines of a multi-cylinder internal combustion engine, which conducts the secondary air into exhaust passages for one or more of the cylinders, and means for conducting a requisite amount of atmospheric air into the intake lines of the all or a part of the cylinders being available for said secondary air conduction, in response to an abrupt change of the negative pressure in the intake pipe through a mixture control valve.

1 Claim, 5 Drawing Figures

APPARATUS FOR PREVENTING AFTER-FIRE OF AN INTERNAL COMBUSTION ENGINE

BACKGROUND OF THE INVENTION

In an internal combustion engine, as one of the countermeasures for treating the exhaust gas for the purpose of decreasing noxious components produced by the combustion in the combustion chamber thereof, a method has been employed, in which secondary air is introduced at a position near the exhaust valve in order to oxidize the noxious components by supplying ample oxygen while the exhaust gas is still at higher temperature to thereby make the noxious components non-noxious. This method has been carried out either by way of so-called "air suction", in which the secondary air is conducted from the air cleaner into the exhaust port through, as the working medium of the negative pressure in the intake pipe, an air switching valve (ASV) and a vacuum transmitting valve (VTV), or by way of so-called "air injection", in which the secondary air is introduced into the exhaust lines from the compressed air from an engine-driven air pump by the control of an air switching valve also under the use of the negative pressure in the intake pipe as the control medium.

Heretofore, the introduction of secondary air was made, in general, for all the cylinders of the internal combustion engine.

In the case of an abrupt deceleration of the engine, however, the unburned gas in the exhaust system may reach an ignitable fuel-air ratio by the introduction of the secondary air, so that it is brought into a state in which the after-fire can occur to cause an unsteady operation of the engine that results in a significant false influence upon the feeling of driving of the automobile. For this reason, it has been carried out, that atmospheric air is introduced into all the intake lines of the cylinders responding to the exhaust lines fed by the secondary air, so as to bring the interiors of the exhaust lines to a state of leaner fuel-air ratio.

However, according to the above prior method, the region of occurence of the after-fire is wide and, above all, in the case of dual type exhaust manifold, though the torque here may be improved, the tendency of occurence of after-fire in the exhaust lines becomes large particularly for air suction type.

On the other hand, in the case of introducing atmospheric air into the intake lines of all the cylinders under the control of the mixture control valve (MCV) by using the negative pressure in the intake pipe as the control medium, the effect is weakened, by the diversification of the requisite amount of air to all the cylinders, that required by the constructive limitation of said valve, or it may be experienced, that inconveniences in the operation of the engine, such as deceleration surge, misfiring and breathing etc., may occur by introducing secondary air into the cylinder, whose combustion state requires no introduction of air, which in the end results in also a false influence upon the feeling of driving of the automobile.

SUMMARY OF THE INVENTION

Therefore, an object of the present invention is, in order to remove the inconveniences mentioned above, to provide, in a multi-cylinder internal combustion engine having the system of introducing secondary air, an apparatus, in which the secondary air is introduced into the exhaust passages of some of the cylinders, whose exhaust lines stand are used for secondary air introduction, and on the other hand, atmospheric air is introduced into the intake lines of the all or some of said cylinders corresponding to those exhaust lines to be fed by the secondary air, in response to an abrupt change of negative pressure in the intake pipe towards the side of lower load upon an abrupt deceleration of the engine.

Another object of the present invention is to provide an apparatus as above, in which the negative pressure itself in the intake pipe is utilized as the medium for responding to the abrupt change of the negative pressure in the intake pipe towards the side of lower load of the engine.

Still another object of the present invention is to provide an apparatus as above, in which the mixture control valve (MCV) is utilized as the means for controlling the introduction of atmospheric air into the intake lines by the negative pressure-responding medium mentioned above.

A further object of the present invention is to provide an apparatus as above, in which the secondary air is supplied by way of the air suction.

A still further object of the present invention is to provide an apparatus as above, in which the secondary air is supplied by way of the air injection.

These and other objects may, together with the advantages and particularities, be seen from the explanation given hereinafter and the drawings attached.

DETAILED DESCRIPTION OF THE INVENTION

Figure 1:
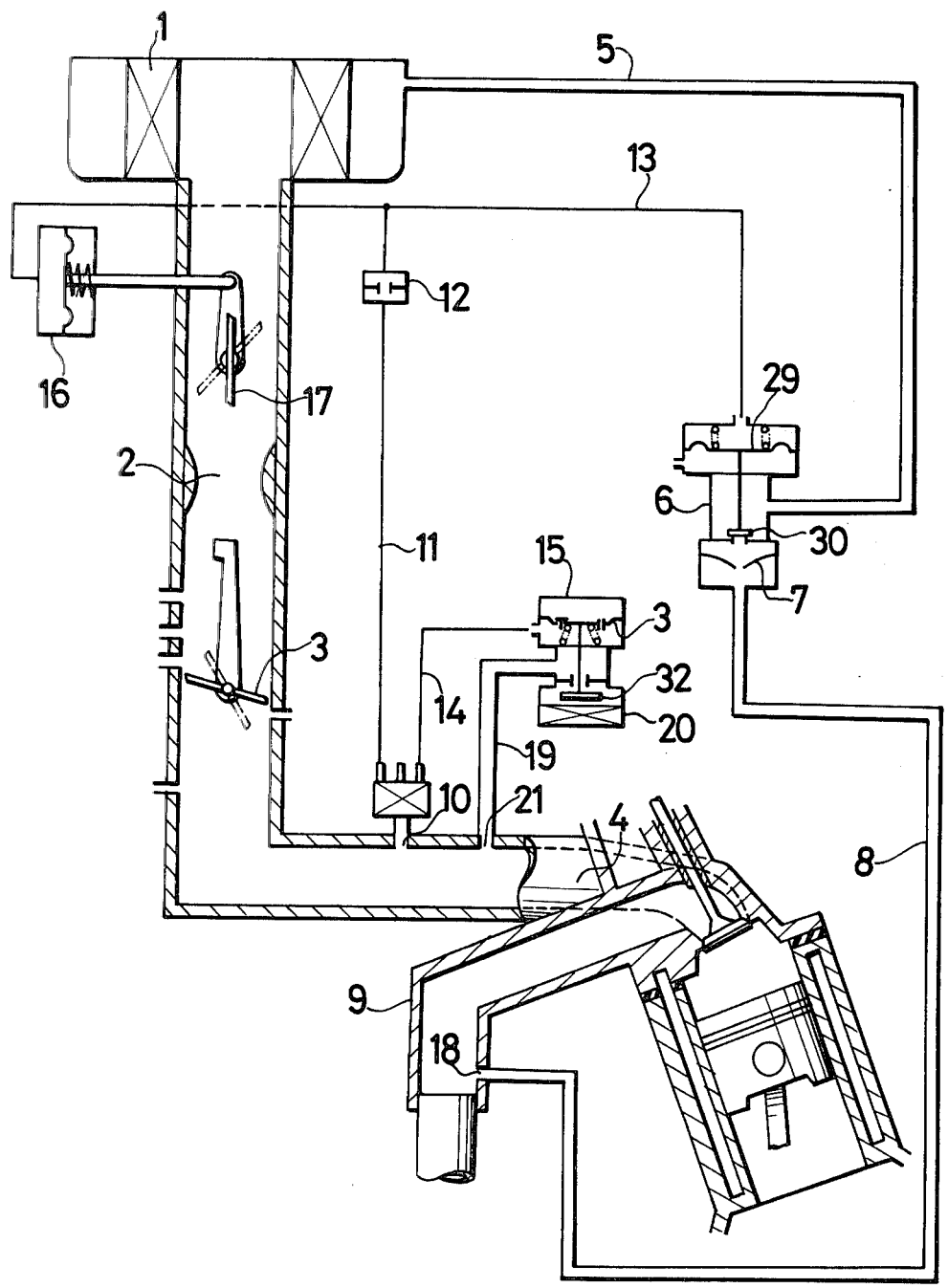
FIG. 1 and FIG. 2 schematically show typical examples of arrangement of the essential constructive elements of prior apparatus for preventing after-fire of an internal combustion engine has applied for the types of air suction and of air injection, respectively.
Figure 2:
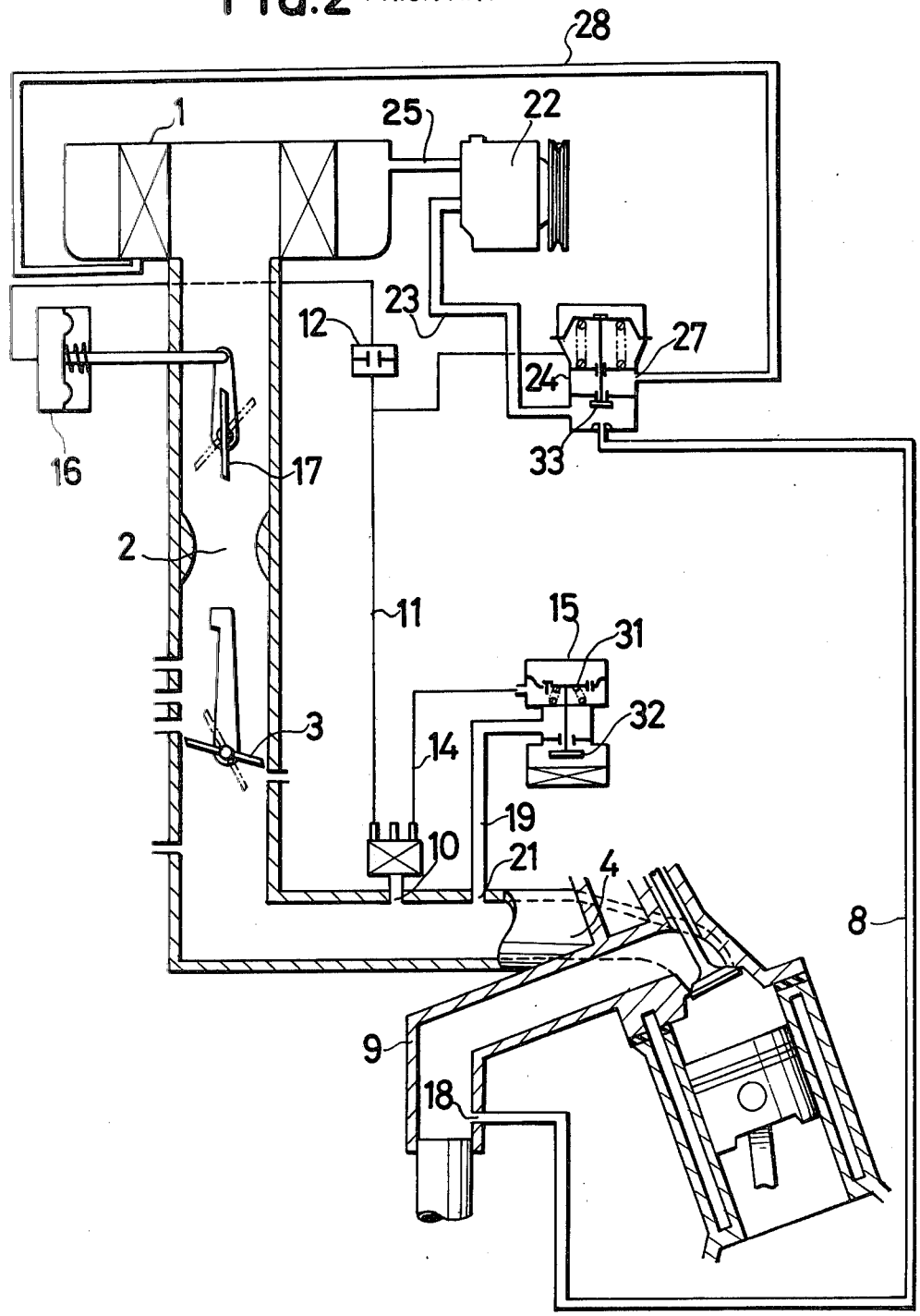
Figure 3:
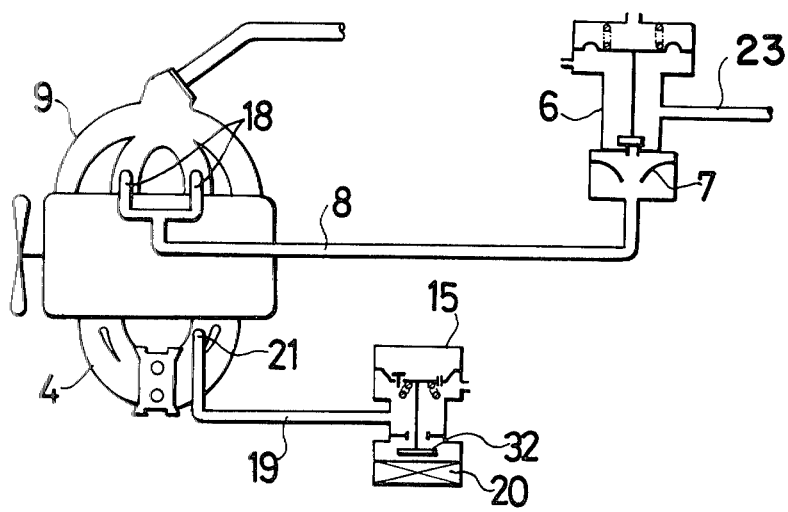
FIGS. 3 and 4 show embodiments of the apparatus for preventing after-fire according to the present invention as applied to a four-cylinder internal combustion engine, in which it is applied for exhaust manifolds of the usual type in FIG. 3 and for exhaust manifolds of the dual type in FIG. 4.
Figure 4:
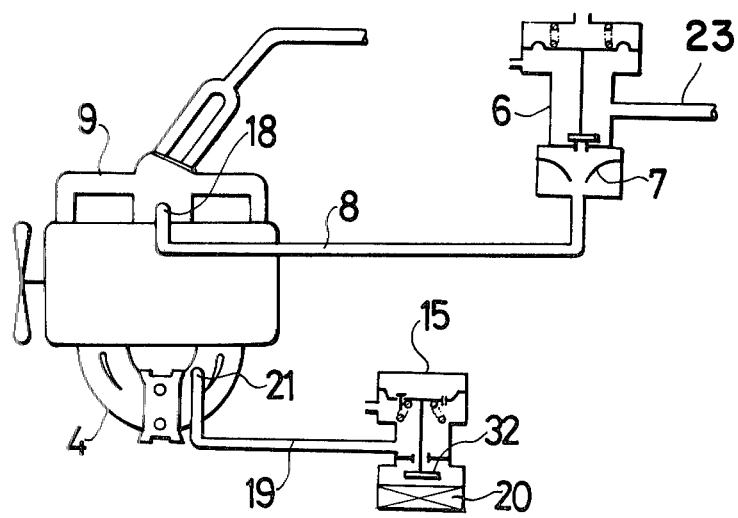
Figure 5:
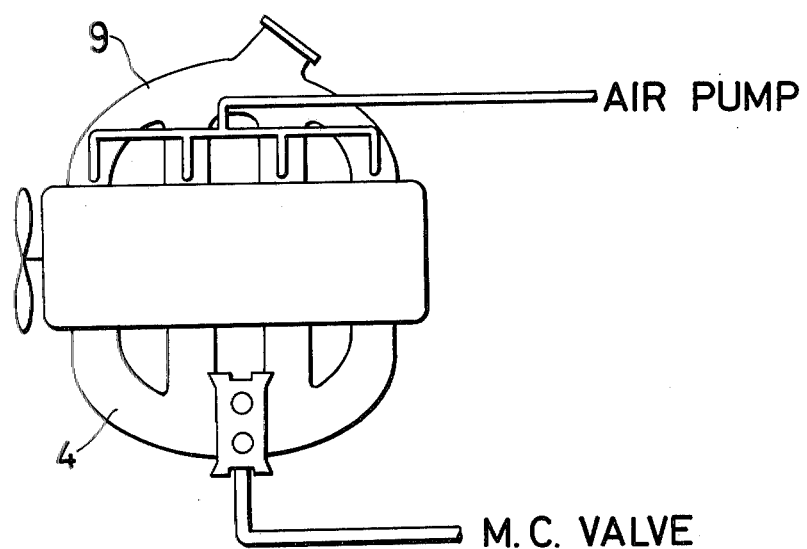
FIG. 5 schematically illustrates still another form of prior art counter measure for preventing after-fire of an internal combustion engine.

FIG. 1 shows a typical example of the arrangement of the essential constructive elements of a prior art apparatus for preventing after-fire of an internal combustion engine equipped with an air suction type system for introducing the secondary air. FIG. 2 shows, similar to FIG. 1, the arrangement and the function of an example of the prior art apparatus using an air injection type system for the secondary air introduction. FIG. 3 shows an example of the application of the air introduction system according to the present invention as applied to a four-cylinder internal combustion engine. FIG. 4 shows an exemplary aspect of secondary air introduction system according to the present invention as applied to an engine equipped with dual type exhaust manifolds. FIG. 5 shows another form of prior art structure for preventing after-fire of an internal combustion engine.

At first, typical aspects of introduction of the secondary air into the exhaust lines as well as introduction of the atmospheric air into the intake lines of an internal combustion engine are explained by reference of FIGS. 1 and 2. In FIG. 1, atmospheric air from the air filter 1 flows into the intake port 4 of the engine passing a carburetor throttle area 2 through a throttle valve 3. In the case of using an air suction system as shown in FIG. 1, the secondary air supply line conducting to the exhaust lines is connected, during the normal operation, to the air switching valve (ASV) 16 from the air cleaner 1 through an air line 5 and communicates further to the air injection port 18 of the exhaust pipe 9 of the engine through the reed valve 7 of the ASV passing an air line 8.

In the drawings, the vacuum lines are indicated by thin solid lines. The vacuum port 10 opening into a portion of the carburetor intake pipe communicates, on the one hand, to the vacuum chamber of ASV 6 through the vacuum line 11 passing a vacuum transmitting valve (VTV) 12 and further passing another vacuum line 13 and, on the other and to the vacuum chamber of the mixture control valve (MCV) 15 through a vacuum line 14. Said vacuum line leaving the VTV 12 can communicate to other control systems of the engine in addition to said ASV 6, such as for example, to the choke opener 16, as shown in FIG. 1, and so on. By 17 a choke valve is indicated. By opening the valve head 32 which is in an interlocking relationship with the movement of the diaphragm 31 housed in the mixture control valve (MCV) 15, an air supply line will be established, passing from the air filter 20 through an air line 19 leading to the injection port 21.

FIG. 2 is an explanatory schematic view showing a supply system for supplying atmospheric air into the intake line and a supply line of secondary air by means of so-called air injection, in which the numeral symbols for the same units as in FIG. 1 are identical therewith.

The apparatus shown in FIG. 2 is equipped, on the one hand, with a flow system, in which the air from the air cleaner 1 flows under compression by an air pump 22 and enters into the lower chamber of an air bypass valve (ABV) 24, wherefrom it flows to the air injection port 18 of the exhaust pipe 9, and on the other hand, with another flow system of an air relief line, which starts from the bypass port 27 of ABV 24 through an air line 28 and leads back to the air cleaner 1. Here the MCV-line is the sane as in FIG. 1.

The function or the action of the lines and systems shown in FIGS. 1 and 2 are as follows: In the apparatus of FIG. 1, the vacuum chamber AVS 6 functions during the normal operation in such a manner that the diaphragm 29 will be lifted up by the action of negative pressure so as to open the valve head 30 and thereby the air from the air cleaner 1 will be sucked into the injection port 18 of the exhaust pipe 9 through the reed valve 7. On the other hand, the air supply into the intake line through MCV 15 is carried out in such a manner that, while the vacuum port 10 is subjected to a noraml negative pressure, the diaphragm 31 is held at its proper position, so that the valve head 32 is in a position of closing the valve to halt the introduction of air from air filter 20 and the supply of air never takes place.

When the engine encounters an abrupt deceleration, the air supply into the intake line through MCV 15 takes place in such a manner that the sudden change of the negative pressure in the vacuum port 10 into the lower load side will act upon the vacuum chamber of MCV through the vacuum line 14 to cause the diaphragm 31 of the MCV 15 to be moved downwards so as to move the valve head 32 to open the valve and thereby the atmospheric air is supplied into the injection port 21 of intake line 4 through the air filter 20. Here, the diaphragm 31 is provided with a check valve and an orifice in such a manner that, by selecting the diameter of the orifice suitably, the time of said air supply can be settled at the requisite value. On the other hand, in the air suction line, the intense negative pressure in the vacuum port 10 is conducted into ASV 6 through VTV 12, which functions to impart a delay of the action upon the vacuum chamber of ASV 6 to cause the valve head 30 to move to open, whereby atmospheric air from the air cleaner 1 will be sucked into the air injection port 18 in a manner retarded by the reed valve 7.

In the apparatus shown in FIG. 2, while the negative pressure in the vacuum port 10 is conducted into the ABV 24 at normal operation, the diaphragm chamber is at equilibrium, so that the valve head 33 is at the position lifted upwards to close the bypass port 27, so as to supply the compressed air from the air pump 22 through air lines 23 and 8 into the air injection port 18 of the exhaust pipe 9. Here the air supply into the intake line through MCV 15 is halted as explained in the example of FIG. 1.

When an abrupt change of the negative pressure in the intake line towards the lower load side occurs in this apparatus, the valve head 33 of the ABV 24 in the air injection line will be moved downwards by the action of the diaphragm to cause the secondary air supply line to close, so as the compressed air is returned to the air cleaner 1 through the bypass port 27 passing an air line 28. The air supply through the MCV 15 into the intake line is carried out as in the case of FIG. 1.

Thus, up to date a countermeasure for preventing after-burning has been adopted by means of air introduction into the intake line during the abrupt deceleration of the engine, together with an air introduction into the exhaust line by way of air suction or air injection. However, as explained above, the introduction of secondary air into the exhaust and intake lines has been usually applied for all the cylinders as shown in FIG. 5, so that it was heretofore impossible to avoid the occurence of inconveniences in operation due to the constructive restriction accompanied by such prior technique. Therefore, according to the present invention, such countermeasure is not applied for all the cylinders but the secondary air is introduced in the exhaust ports of only one or several cylinders and, on the other hand, air introduction is further conducted for at least one and at the most all the intake lines of those cylinders, which are coincident with said air-introduced exhaust ports.

According to the present invention, among cylinders arranged, for example, in series from No. 1 to No. 2, as shown in FIG. 3, from the front (left in FIG. 3) to the rear, being equipped with exhaust pipe 9, which are provided each for each of the cylinders, secondary air is supplied into the air injection ports 18 of exhaust pipes for No. 2 and No. 3 cylinders from the ASV 6 through an air line 8, while on the other hand, the air from the MCV 15 is supp'ied through an air line 19 to one (No. 3 in FIG. 3) of the cylinders, to which said air-supplied exhaust ports belong.

The apparatus shown in FIG. 4 reveals an arangement resembling FIG. 3, in which dual exhaust manifolds are employed for the exhaust system. Here, air is introduced into the exhaust lines for cylinders No. 2 and No. 3 and into the intake line for No. 3 cylinder.

In FIGS. 3 and 4, the state of an engine subjected to an abrupt deceleration is indicated, in which MCV 15 is caused to open its valve head 32 in response to an abrupt change of the negative pressure in the intake line towards the lower load side, so that the atmospheric air from the air filter 20 will be introduced into the intake port 21 of the desired cylinder through an air line 19.

As the objective cylinders, to the exhaust and intake lines of which air is introduced, there are selected in FIGS. 3 and 4 cylinders No. 2 and No. 3 for the exhaust line and No. 3 for the intake line. However, this is merely for the sake of explanation.

It will be readily apparent, that it is possible to select the objective cylinders in voluntary combination, without departing from the scope of the present invention, that secondary air is introduced into the exhaust lines of only a part of the cylinders but not of all the cylinders and, on the other hand, the introduction of air into the intake lines for preventing after-fire is restricted only for a part of or all of said cylinders specified.

Since the present invention is constituted as above, it becomes now possible to attain remarkable effects upon the prevention of after-fire of the engine together with the prevention of inconveniences such as deceleration surge, misfiring and breathing, by restricting the objective cylinders coincident with the exhaust lines to be fed by secondary air, compared to those prior techniques, in which, as the counter-measures for the exhaust gas problems, secondary air is introduced into the exhaust lines and is introduced into intake lines upon deceleration of the engine and in which the defects mentioned above have been encountered.

What is claimed is:

1. Apparatus for preventing after-fire in a multi-cylinder internal combustion engine, which is equipped with means for treating the exhaust gas by introducing secondary air into the exhaust lines, comprising the combination of means to introduce secondary air by means of an air injection system into the exhaust passage of only some of the total number of cylinders of said engine, and means to introduce atmospheric air for a predetermined period of time by means of a mixture control system into the intake lines of some but not all of the cylinders which have been supplied with secondary air, the atmospheric air being introduced in response to an abrupt change of the negative pressure in the intake lines towards the lower load side.

* * * * *